Aug. 8, 1933.   P. S. ENDACOTT   1,921,968
DELIVERY SYSTEM
Filed April 21, 1930   2 Sheets-Sheet 1

Inventor
P. S. Endacott,
By Robt. E. Barry
Attorney

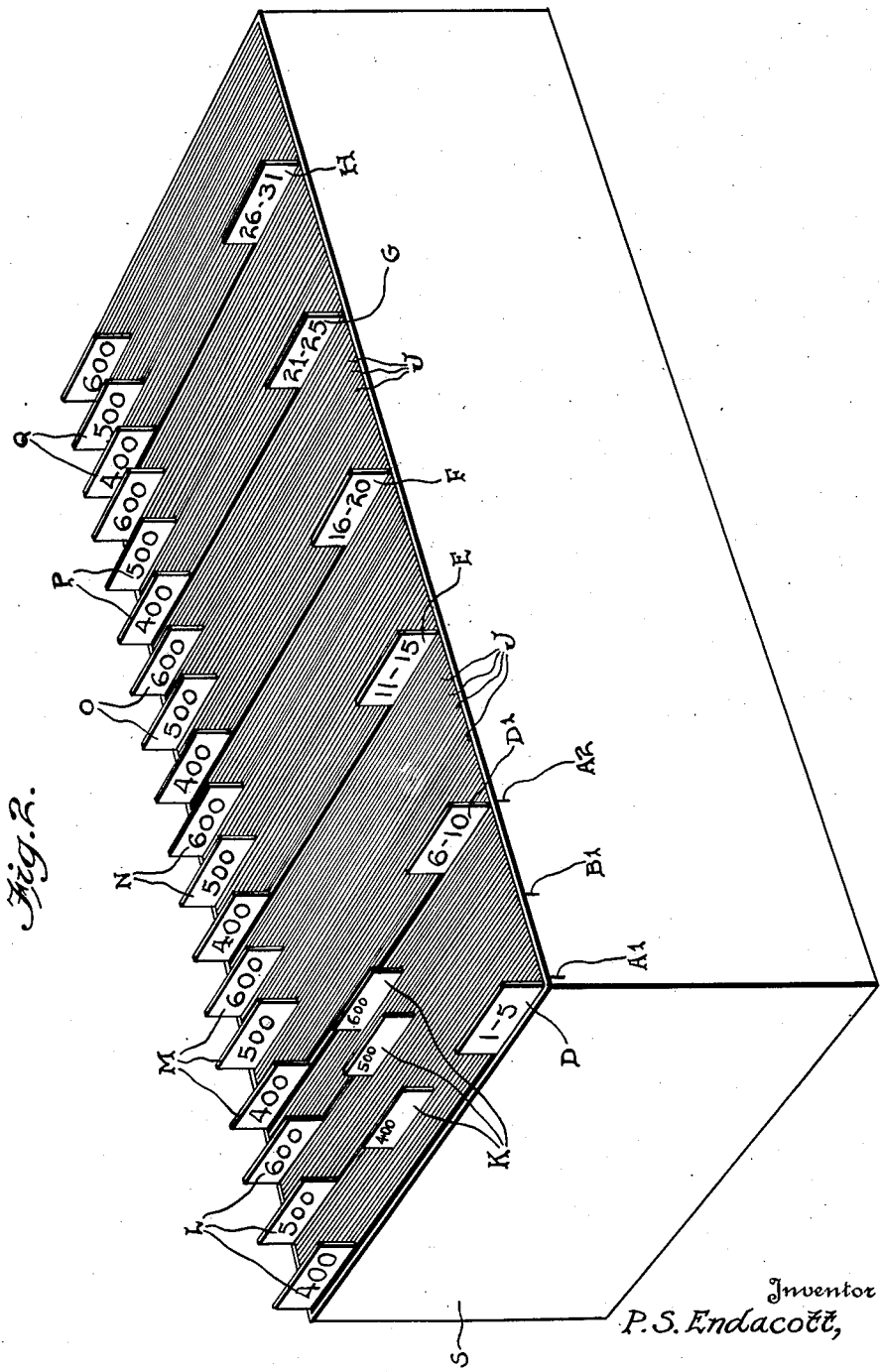

Patented Aug. 8, 1933

1,921,968

UNITED STATES PATENT OFFICE 1,921,968

DELIVERY SYSTEM

Paul S. Endacott, Detroit, Mich., assignor to Phillips Petroleum Company, Bartlesville, Okla., a Corporation of Delaware Application April 21, 1930. Serial No. 446,084

1 Claim. (Cl. 129—16.5)

This invention relates to an improved dispatching indicator for use with a delivery system in which any commodity, for example, liquefied petroleum gas, is to be delivered periodically, or once a month, to customers located within a given territory, and the primary object of the invention is to provide indicating means by which the office of the operating company may keep track of the deliveries to insure that the customers receive their supplies at proper times, etc.

While my dispatching indicator may be used in connection with the delivery of various commodities, I will disclose the invention as employed in a liquefied gas delivery system.

Another object of the invention is to provide a delivery dispatching indicator by which each customer is insured of the receipt of his gas delivery service on practically the same date each month. Due to this, the amount of the customer's bill will be for a uniform period of time, which will assist materially in furnishing a correct understanding of the cost of operation.

Another object is to provide a delivery dispatching system in which there will be a minimum of new customer locations for a deliveryman to learn, as he will repeatedly service practically the same customers from month to month.

A further object is to furnish a dispatching indicator which will be flexible to the last degree, accommodating itself to an expanding number of customers and increasing number of delivery trucks.

A still further object is to furnish a dispatching indicator that will provide a perfect visible control of the delivery schedule each day.

Another object is to provide a ready means of comparing the efforts of the various deliverymen, and the results which they accomplish.

A further object is to provide convenient units for route books and accounting methods.

Another object is to provide a delivery system indicator affording flexibility for adjusting the delivery effort assigned to a particular truck in accordance with the peculiarities of certain sections of the area, from the standpoint of highways, distance between customers, size of individual consuming loads, distance from the station, etc.

Another object is to furnish a dispatching indicator which can readily be expanded to accommodate any conceivable number of customers that might ever be obtained, simply by proceeding along the same lines as for a small number of customers.

With the foregoing objects outlined and with other objects in view which will appear as the description proceeds, the invention consists in the novel features hereafter described in detail, illustrated in the accompanying drawings, and more particularly pointed out in the appended claim.

Referring to the drawings,

Fig. 2 is a perspective view of a dispatching indicator to be employed in connection with the map in the office of the central distributing station.

Without doubt, the greatest factor affecting sales within a given territory is the maintenance of continuous high quality gas delivery service. Without this as a solid foundation to build on, no amount of sales effort from personal contact or advertising can accomplish the customer saturation that the dealer expects.

From the financial standpoint, cost of delivery is the greatest item affecting operating expenses.

Because of the importance of the two matters just mentioned, a system of organizing delivery routes has been developed, which should provide for a district manager at any moment, a bird's-eye view of his territory, an "up-to-the-minute" description of his delivery situation in minute detail, at a glance.

It is to be understood that with my system, I endeavor to duplicate in the district office, by very compact but exact picture, what actually exists in that particular district.

Figure 1:
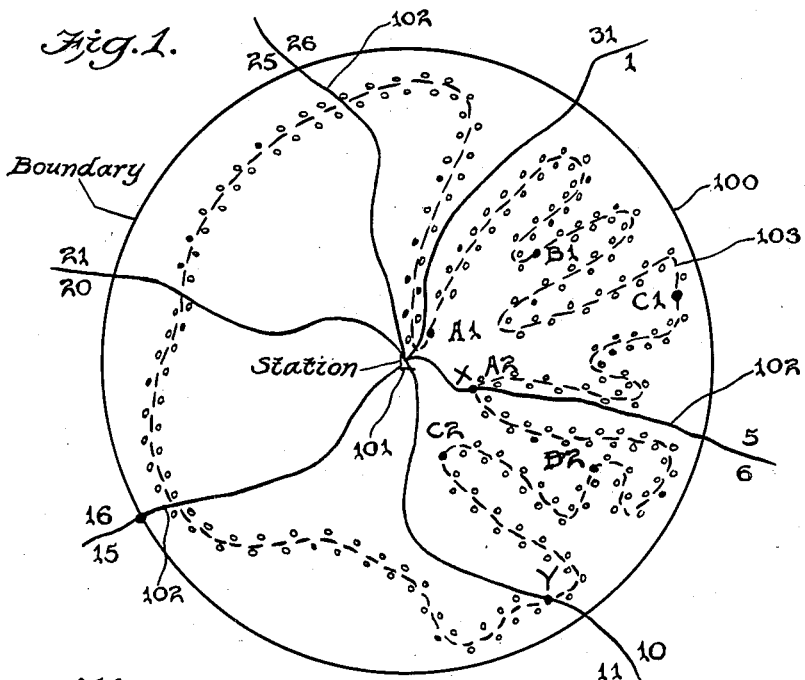
Fig. 1 is a diagram or map of an area to be serviced from a central distribution station.

Referring to Fig. 1, the circular line 100 represents the actual boundaries of an area or district in which the system is to be used. Somewhere within the central portion of this area is located, a distributing station 101. Radiating out from this distributing station, so as to divide the entire area into sectors, are six radial lines 102 (for example), extending indefinitely away from the station. Although these radial lines actually divide the territory into six geographical sections, they also divide it into six calendar divisions, representing the territory to be served in five-day periods of time throughout the month. Taking into consideration, differences in delivery loads, etc., within these six sectors of the area, it will readily be seen that all of the divisions will not be equal in geographical size. However, they are equal in delivery load, or the degree of difficulty in servicing customers. For instance, the first sector will represent that area covered by the delivery trucks in the period between the 1st and the 5th of the month, and in this connection, it will be noted that the numeral 1 is arranged adjacent the first division line, and the numeral 5 adjacent to the second division line. The next sector to that will represent the geographical area covered by the trucks in the period between the 6th and the 10th of the month; and so on. In order that this may be readily understood, the numerals 6 and 10 are arranged outside of the boundary, but within the division lines of the second sector; 11–15 indicate the calendar period for the third sector; 16–20 the fourth sector; 21–25 the fifth sector, and 26–31 the sixth sector. In other words, the map in the office has the geographical sectors designated to indicate calendar periods.

The dotted line 103 on the map starting at the station, represents the route which would be travelled by an individual truck starting out from the station at the first of the month, and visiting every single customer within the area over the shortest possible route, and ending up at the station at the end of the month. If there was only one truck operating in the district, that truck would start at the station on the 1st day of the month, and service the customers within the first sector, and end up at the point marked X, either prior to, or on the 5th of the month, depending on the number of customers already within the territory which are assigned to this first sector of the area. On the 6th day of the month, the truck would start at X and continue on through the second sector, until it ended up at Y, either before or on the 10th of the month, depending again on the number of customers to be served. Obviously, the truck will continue on its route and service the third, fourth, fifth and sixth sectors, so as to be ready to start at the beginning of the route the first of the following month.

I will now assume that there are three trucks within the territory. On the 1st day of the month, truck A would start out from the station at position A', truck B would start at the position B', and truck C would start at the position C', it being understood that each truck would carry its load from the station to its respective starting point before commencing any delivery. Approximately, on the 5th of the month, truck A should arrive at position B', truck B should reach position C', and truck C should end at position X, or A2.

Then, on the morning of the 6th of the month, truck A, which has finished the night before at position B', starts out in the second sector at position A2; B truck starts on the same day at B2, and truck C at C2. On approximately the 10th of the month, truck A, in completing its assignment, finishes at B2, truck B at C2, and truck C at station Y. Of course, on the 11th of the month, the three trucks will start out at predetermined positions in the third sector, and so on until the deliveries have been completed in the sixth sector on approximately the 31st of the month.

It may be readily seen from the foregoing, first of all, a territory growing in number of customers, might be subjected to a gradual shifting of the sector dividing lines, so as to accommodate variations in load occurring in various parts of the area. It will also be readily understood, next, that within any one of these six sectors, total delivery load is readily divisible into several smaller equal delivery loads for any number of trucks.

In fact, what I am doing is actually to make the most logical group of customers receive service within a given period by dispatching all of the trucks at the same time to the duty of providing that particular group of customers with the service.

The above explanation gives in detail the movements of the trucks in the actual operating district. Attention is now directed to the arrangement of the office route file, so as to picture, at any moment, the exact field situation existing, from the standpoint of servicing customers. For example, Fig. 2 represents the office route card index or dispatching indicator. In its simplest form, it will be divided into six divisions of delivery loads, representing the six five-day periods of a calendar month. These division lines or cards, designated D, D', E, F, G, H, (Fig. 2) divide the card index or indicator into six sections, corresponding with the six sectors of the map. The first card in this route file is the first customer to be serviced in the first sector of the territory, and the last card, the last customer to be delivered to in that same month. Between these two extreme cards, all of the customers' cards J are arranged in the exact geographical order in which they are located in the various sectors of the area, as denoted by the dotted line in Fig. 1.

Assuming that one truck can service approximately five hundred customers, each of these six divisions in the file will have approximately 85 cards. Some divisions, no doubt, will have less than 85 cards, due to the fact that the users in that particular section are a long distance from the station, or extremely large consumers, or some similar peculiarity. Others of the six calendar divisions may have more than 85 customers, due to the fact that the consumers are located close to the station, are average or small users, etc.

With this simple file and one delivery truck, service would start on the 1st day of the month, and the truck would be expected to cover all of the customers in the first sector of the map, and whose cards are within the first section of the file. On the morning of the 6th, the truck would start at the point X where delivery was finished on the 5th, and this truck would continue to service the customers in the second sector of the map, in accordance with the arrangement of their cards in the second section of the file.

Figure 4:
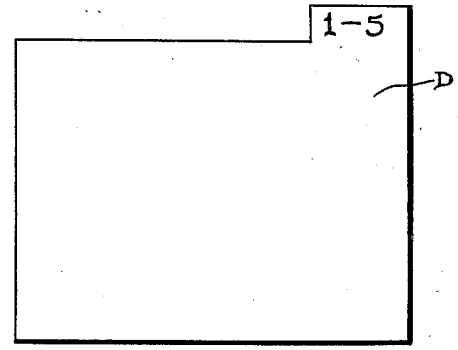
Fig. 4 is a similar view of one of the calendar or geographical division cards.
Figure 5:
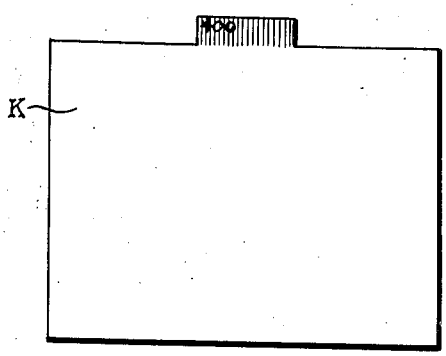
Fig. 5 is an elevation of one of the flag cards.

Each day, as the deliveryman turns in his daily report at the office, the clerk charts the position of the truck as of that date, by placing a flag K (Fig. 5) in the delivery file at the point of last customer serviced. At any date, therefore, the manager may glance at the file and tell exactly whether the truck is behind schedule, or ahead of schedule, simply by observing the position of the flag, and comparing it with the point at which the truck should be, as represented by the dates on the partition cards D, D', E, F, G, H, (Fig. 4).

Figure 3:
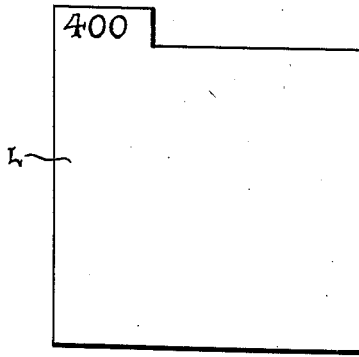
Fig. 3 is an elevation of one of the truck cards.

Now, assuming that expanding sales in the territory necessitates the addition of a second delivery truck, we still must service all of the customers who have been serviced between the first and 5th of the month again, within that same period, and so on down through the file. Therefore, we will sub-divide the load previously assigned to truck A, for the first five days of the month, between the two trucks, by inserting in the file, a divider card L, (Fig. 3) assigning this first delivery load to trucks A and B. To facilitate illustration, the divider card L is shown nearer the partition D, than the partition D', but in actual practice, where the customers in the first sector are assigned to two trucks, the divider card L should be placed midway between partitions D and D'.

Naturally, truck A, which has been working very diligently in order to handle all of the customers in his delivery sector, will now have a much easier job, because of B's assistance. Each calendar period, right down through the file, is divided also into equal parts, by dividing cards M, N, O, P, Q, (Fig. 2) representing the assignment for trucks A and B during every calendar period of five days.

On the first day of the month, truck A starts out with a list of customers represented by cards between the file indications A1 and B1, that is, between the partitions D and L. Truck B starts out the same day with a list of customers represented by the file cards from B1 to A2. This same procedure follows at the beginning of each calendar period, right on down through the file to the end. By charting the progress of each truck by a different colored flag K, each day, the manager can tell exactly the position of each truck on its respective service route in the district; can tell whether the delivery service is ahead or behind schedule, and can compare the results of his two deliverymen. For three or any additional number of trucks, identically the same procedure follows, and Fig. 2 shows the card index arranged for a three truck system.

As new customers come on to the books, their cards are inserted into the file at their exact route position on the date of their installation. Regardless of the number of days, then, which our customer has been installed, a delivery truck will call upon him as it passes the geographically correct location of that customer in the district. This procedure thereby places that customer automatically within a specific calendar service period, and after the first bill is rendered, all bills will be for approximately thirty days.

Now that I have described the operation of the trucks in the district, and also the route plans in the office, from an operating standpoint, I will next describe how a route file is prepared.

Assuming that the cards are kept in a holder or file box S, the interior of this box will first be divided by six heavy divider cards D, D', E, F, G and H, representing periods of the month such as the 1st to the 5th, 6th to 10th, 11th to 15th, etc. Now, the customers' cards J, which are geographically arranged in accordance with the dotted line 103 on the map in Fig. 1, will be divided into six groups or sections, all of the cards of the customers in the first sector being placed in the box between the dividers D and D'; all of the cards of the customers in the second sector being arranged between the dividers D' and E; and so on.

Second, six dividers are prepared for each truck in a district, and these dividers have tabs thereon listing the company car number of the truck. These truck dividers are inserted into the file, one in each of the six calendar divisions of the file, so as to represent that truck's delivery assignment for each five-day period. These truck dividers are designated L, M, N, O, P, Q.

Third, one special divider or flag K for each truck, with a tab of different color for each truck, also having the company car number of the truck typed thereon, is to be prepared and used as a flag to chart the progress of that truck through its delivery schedule.

The entire system is based upon certain assumptions, all of which are facts that are fundamental in the operation of such a service, regardless of what system of delivery, routing, or scheduling might be devised. They are:—

First, every customer has a sufficient storage reservoir for one month's supply of liquefied gas, for example.

Second, new customer cards are placed in the route file in exactly that route order which is the most logical from the standpoint of economical servicing.

Third, only one man in the office should be allowed to touch the route or dispatch indicator file, so as to make him responsible, and to see that this file is never allowed to become delinquent in any detail.

Fourth, delivery trucks must adhere to the schedule from the standpoint of rotation, regardless of any emergencies or external occurrences that might happen, handling every special case as a matter entirely separate from the above described delivery structure.

With such a system, there should be a route book for each delivery truck. This route book, like the map and the file, should be divided into six sections, each section containing in rotative order, all customers to be serviced by that particular truck during each of the six calendar delivery periods. This would eliminate any necessity for passing route books around among different drivers, and would place all the responsibility for keeping the customers' cards in correct economical delivery order, directly on to the driver who would have to service those customers.

While I have disclosed what I now consider to be a preferred embodiment of the invention in such manner that it may be readily understood, I am aware that changes may be made in the details described, without departing from the spirit of the invention, as expressed in the claim.

What I claim and desire to secure by Letters Patent is:

A dispatching indicator for use with a commodity delivery system, comprising a holder, a multiplicity of cards, one for each customer, said cards being of uniform thickness and arranged one behind the other in the holder, divider cards arranged in spaced relation in the holder and dividing the customer's cards into groups, each divider card having a projecting tab, the tabs of the successive divider cards bearing successive designations indicating calendar periods, a plurality of cards insertable into said groups, each of the last-mentioned cards having a projecting tab bearing indicia indicating a particular truck servicing an allotted portion of a group of customers, and a plurality of flag cards insertable into any one of said groups according to reported positions of the trucks, each of the flag cards having a projecting tab marked to indicate a particular truck, said projecting tabs forming indicators whereby an operator may visually compare the position of the flag cards with relation to the truck cards and determine the location of trucks among their allotted customers.

PAUL S. ENDACOTT.